No. 687,888. Patented Dec. 3, 1901.
J. J. KOLLER.
DUST PROOF ROLLER BEARING.
(Application filed May 6, 1901.)
(No Model.)
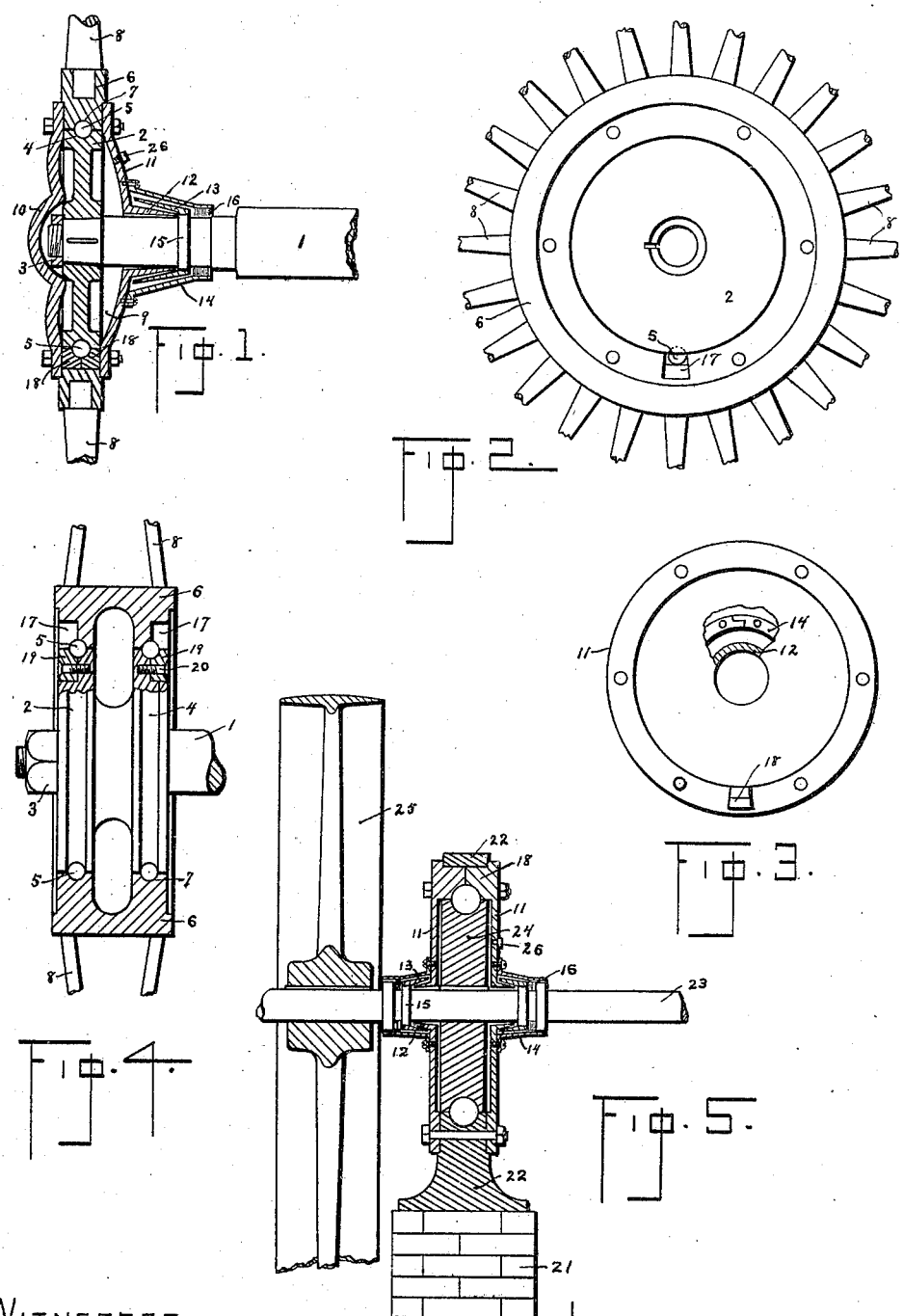
WITNESSES, INVENTOR,
John J. Koller
By S. E. Fouts, Atty.
THE NORRIS PETERS CO., PHOTO-LITHO., WASHINGTON, D. C.

UNITED STATES PATENT OFFICE.

JOHN J. KOLLER, OF CLEVELAND, OHIO.

DUST-PROOF ROLLER-BEARING.

SPECIFICATION forming part of Letters Patent No. 687,888, dated December 3, 1901.

Application filed May 6, 1901. Serial No. 58,956. (No model.)

*To all whom it may concern:*

Be it known that I, JOHN J. KOLLER, a citizen of the United States, residing at Cleveland, in the county of Cuyahoga and State of Ohio, have invented a new and useful Improvement in Dust-Proof Roller-Bearings, of which the following is a specification.

This invention relates to dust-proof roller-bearings, and has for its objects the production of a device of this character which is adapted to a wide variety of uses, which is practically dust-proof, which is simple, durable, and strong in construction, which is exceedingly light and smooth in operation, and which can be kept well supplied with oil at all times. These objects I attain by the structure shown in the accompanying drawings, which show my preferred form, in which—

Figure 1 shows a central section through my roller-bearing as it is applied to a wheel or pulley which rotates about a fixed central shaft or axle. Fig. 2 is a side elevation of the central disk and the wheel or pulley, the axle, the right-hand cover-plate, and the dust-guards being removed. Fig. 3 is a side elevation of the inner side of the right-hand cover-plate, showing the lug on the same for closing the opening to the ball-race. Fig. 4 is a section through the center of the bearing, showing it applied to a heavy wheel or pulley, the cover-plates and the dust-guards being removed; and Fig. 5 shows my bearing when used as a journal for shafting.

Similar reference characters designate corresponding parts throughout the several views of the drawings.

In roller-bearings as heretofore constructed it is very difficult to exclude dust from the balls or rollers, so that the bearing is quickly filled with grit and dirt, which results in the rapid wear of the contacting-surfaces and in a great increase in the friction. Furthermore, the small diameter of the raceways has necessitated a small number of balls or rollers with correspondingly small diameters. This gives but a few bearing-points, and if the load on the bearing is heavy the weight sustained by each ball is so great that it results in the rapid wearing of the bearing if not in the crushing of the balls. In order to overcome the first of these difficulties, I provide a plurality of dust-guards so arranged that before the dust can reach the balls it must travel a tortuous path and pass by obstacles which are intended to completely obstruct its passage. The second difficulty is overcome by placing the raceways for the balls on a disk of large diameter, so that a large number of large balls or rollers having a correspondingly large number of bearing-points may be used.

In Figs. 1 and 4 of the drawings forming part of this application, 1 is a stationary or non-rotatable shaft or axle which may form a part of any sort of vehicle or may be employed in any relation where a rotary member turns upon a stationary shaft. Keyed or otherwise suitably secured to the end of said shaft or axle is a disk 2, said disk being preferably bored at a taper to fit the end of the shaft, to which it is held by means of a nut 3. Within the outer periphery of the disk and extending entirely about the same is cut a semicircular groove 4, which forms a portion of the raceway for the balls 5. The disk 2 may be of any suitable or desired diameter to accommodate such a number of balls or rollers as may be necessary to sustain the load placed upon the bearing without undue friction or compression.

Arranged outside of the disk 2 is the wheel, pulley, or other rotatable device 6, the inner portion of the same lying close to the periphery of the disk. This wheel has in its inner periphery a semicircular groove 7, corresponding to the groove 4 in the disk and facing the same, so that the two together form a complete circular groove about the disk, the diameter of the passage-way being slightly larger than that of the balls which travel in it.

For purposes of illustration I have shown the wheel or pulley 6 as provided with spokes 8. It will be understood, however, that these form no part of my invention and that a solid disk—as a car-wheel, for example—may be used instead.

In order to protect the bearing from dust and at the same time to provide a chamber 9 in the bearing for oil, I bolt or otherwise suitably secure to the sides of the wheel or pulley cover-plates 10 and 11, the plate 10 being continuous to completely cover the end of the shaft or axle as well as the disk and the plate 11 being open at its center for the entrance of the shaft. To further provide against the entrance of dust through the opening in the cover-plate 11, I provide the plate with an outwardly-projecting flange 12, which fits snugly about the axle and extends for some distance along the same. This makes it difficult for any dirt to reach the chamber 9 on the balls 5. However, it is possible for the dirt to enter in spite of the cover-plates and the flange 12, and for this reason I provide my bearing with two dust-guards 13 and 14, the former being secured about a collar 15 on the axle and extending outside of the flange 12 almost to the cover-plate 11 and the latter being secured to the cover-plate and extending outside the dust-guard 13 to a point some little distance beyond the collar 15. With this structure no dust can reach the interior of the bearing without passing first between the dust-guards, then between the guard 13 and the flange 12, and then between this flange and the axle. To still further guard against the entrance of dust, I provide the inner part of the dust-guard 14, which is beyond the collar 15, with a small annular brush 16, which rubs against the axle at all times, and thus closes the entrance to the bearing. Washers of felt or other material may be used instead of the brushes. As it is necessary to place the dust-guard 14 on after all the other parts are in position, I make the same in two half-shells, as shown in Fig. 3, the shells overlapping each other to more effectually guard against the entrance of dust.

It will be evident that if the grooves 4 and 7 were absolutely continuous it would be impossible to get the balls into position. For this reason it becomes necessary to provide a breach in said grooves for the passage of the balls and also to have means for closing this breach. This breach is shown at the lower part of the raceway in Figs. 1 and 2 and at the upper part in Figs. 4 and 5. In those forms shown in Figs. 1, 2, and 5 the outer part of the bearing carrying the outer half of the raceway is cut away on each side at 17 for a distance slightly greater than the diameter of the balls, so that they may be passed therethrough. These breaches are closed by lugs 18, which are secured to the cover-plates 10 and 11, said lugs having a curved portion which forms part of the raceway when they are in position. As the parts which carry the raceway should be made of steel, the lugs 18 should also be formed of this metal. The cover-plates, however, may be formed of other material, such as malleable iron. For this reason I prefer to make the lugs separate from the cover-plates and afterward secure them thereto. It will be seen from Fig. 1 that if only one cover-plate, with its lug 18, were removed the opening through the breach would still be too small to permit the balls to pass. For this reason both plates are formed with lugs and both lugs must be moved outwardly in order to remove the balls.

It may sometimes be desirable to provide a wider bearing than a single row of balls will afford. In such cases a double row of balls or rollers may be employed, as shown in Fig. 4, the disk 2 and the wheel or pulley being each provided with two half-grooves for the balls 5. As will be understood, it would be impossible to get at the inner parts of the raceway to close up the breaches there if such should be formed. For this reason I make this part of the raceways continuous and in order to make a passage-way for the balls form the disk 2 with a removable plug 19, which is secured in position in any suitable manner, as by a machine-screw 20.

In each of the forms shown in Figs. 1 and 4 the supporting shaft or axle is stationary, while the moving part rotates about the same, the only part of contact being a comparatively narrow band, which dispenses with the elongated hub heretofore used, thus constituting a practically hubless wheel. My invention is adapted, however, to be used in bearings of various kinds, as for shafting, car-axles, automobiles, and, in fact, for any purpose where a shaft rotates.

Fig. 5 shows my invention so applied, 21 being a support for the outer stationary part 22, which corresponds to the wheel 6 shown in the other views. 23 is the rotatable shaft which carries the disk 24. This bearing is provided with cover-plates, flanges, dust-guards, and brushes on each side, like those shown on the right-hand side of Fig. 1. 25 is a pulley or wheel carried by the shaft.

I have previously referred to the space between the cover-plates 10 and 11 as an "oil-chamber" 9. In using my device I put the same together, as shown, and then introduce oil through a hole in the cover-plate until the chamber is partially filled and the lower balls are well covered. The hole is then stopped by any suitable device, as indicated at 26.

From the foregoing description it will be seen that I have produced a bearing which is simple, strong, durable, dust-proof, light-running, and easily lubricated. By using different sizes of balls the bearing may be adapted to all sorts of uses.

It will be understood that while I have shown simply balls in the bearing cylinders or any other sort of rolling devices may be used instead.

Having thus described my invention, what I claim as new, and desire to secure by Letters Patent, is—

1. In a roller-bearing, a stationary member having a groove for rollers, a movable member rotatably mounted with reference to the stationary member and having a groove for rollers corresponding with that in the stationary member, breaches leading to the grooves cut in the sides of one of said members, cover-plates secured to the member having the breaches and covering the bearing, and lugs secured to said cover-plates and extending into the breaches to close the same and to complete the groove.

2. An axle, a disk on the axle having a single groove for rollers in its periphery, a wheel surrounding the disk and having a corresponding groove, the two grooves being so related that the rollers extend into both so that the rollers hold the wheel in position on the disk, and means for opening the grooves to insert and remove the rollers, cover-plates for holding said means in position, said cover-plates bulging to form a chamber for oil, and means through which the oil is introduced into said chamber.

In testimony whereof I affix my signature in the presence of two witnesses.

JOHN J. KOLLER.

Witnesses:
JOHN M. GARFIELD,
S. E. FOUTS.